A. HITCHCOCK.

Quartz Crusher.

No. 40,103.

Patented Sept. 29, 1863.

UNITED STATES PATENT OFFICE.

ALONZO HITCHCOCK, OF CHICAGO, ILLINOIS.

IMPROVEMENT IN QUARTZ-CRUSHERS.

Specification forming part of Letters Patent No. 40,103, dated September 29, 1863.

*To all whom it may concern:*

Be it known that I, ALONZO HITCHCOCK, of Chicago, in the county of Cook and State of Illinois, have invented a new and useful Improvement in Crushing and Grinding Mills; and I do hereby declare that the following is a full, clear, and exact description of the same, reference being had to the accompanying drawings, making a part of this specification, and to the letters of reference marked thereon.

In ordinary mills consisting of an upright wheel revolving on its edge in a circular trough, in which the material to be crushed or ground is placed, the power is applied to the axis of the wheel, and is transmitted by dragging the wheel around its path with the friction upon the journal incident to the entire power used in effecting the crushing or grinding. Two or more wheels have also been used, operating in a similar manner.

The object of my invention is to rotate the wheels in a manner which will avoid this objectionable friction, and it is accomplished by applying the power to a cap placed over a series of wheels, and resting upon them in such a manner that the rotation of the cap causes the wheels to revolve and advance. If, therefore, the peripheries of the wheels and the bearing-surfaces of the base and the cap were made conical, so that the wheels would have no tendency to depart from their circular path, there would be no friction whatever. I prefer, however, to make the peripheries of the wheels slightly rounding and to furnish them with comparatively small shafts, by which they are retained in their relative spaces around the circle, and which also support them in an upright position. Three wheels are used, that the cap may be uniformly supported and exert a pressure which is practically uniform upon them, although they may not be similarly acting upon the quartz or other material being crushed. The cap may be loaded with stones, earth, or any other convenient material to the degree required to accomplish the work desired.

To enable others skilled in the arts to which it appertains to make and use my invention, I will proceed to describe its construction and operation with reference to the drawings.

Figure 1:
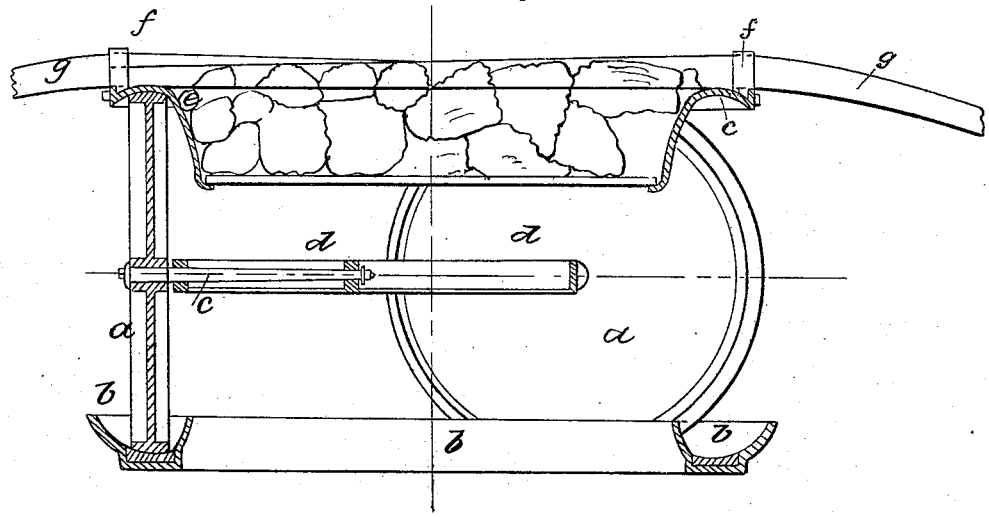
Figure 2:
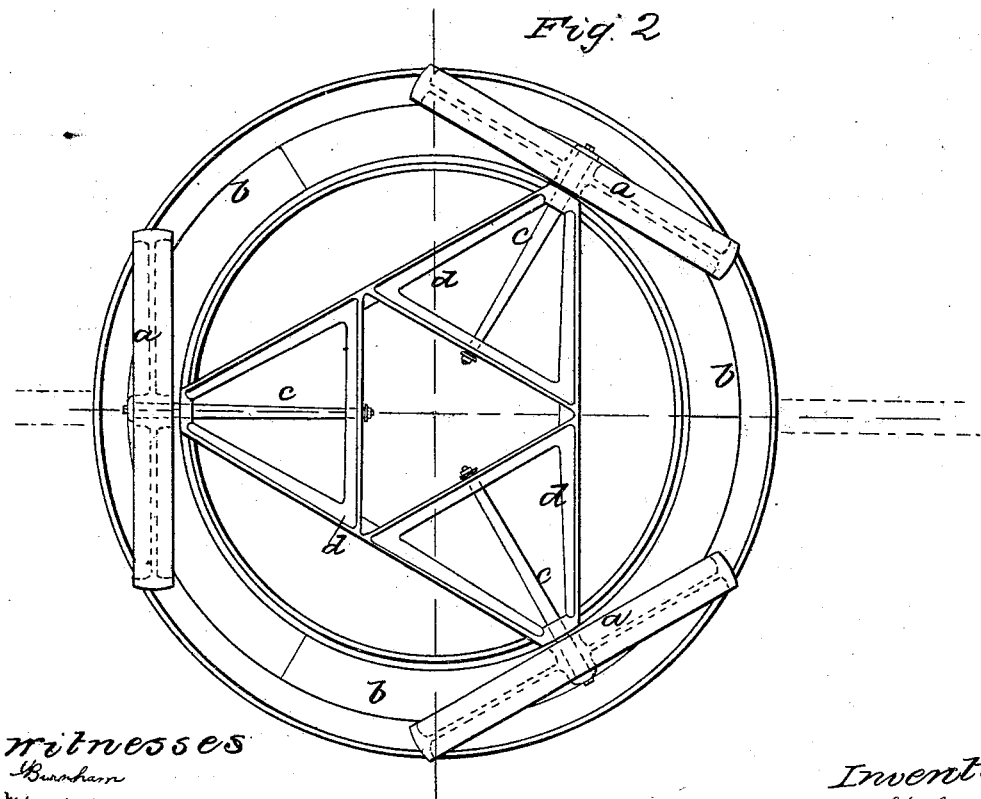

Figure 1 is a cross-section of a mill made according to my said invention, and Fig. 2 is a plan of the same with the cap removed to show the parts underneath.

The wheels $a$ revolve in the circular trough, $b$, and are supported by the shafts $c$ in the frame $d$. The frame may be replaced by a central shaft and collar, for the reception of the ends of the shafts, and the wheels may be spaced by means of chains connecting collars placed upon their shafts. The cap $e$ extends downward inside the wheels like a basin, to contain the material with which it is loaded, and it is furnished with brackets $f$ for the driving-levers $g$, to which animal-power may be applied. Other power may be used and applied by a pinion-gearing into the periphery of the cap or by a belt working upon it. The base or trough $b$, in which is placed the quartz or other material to be pulverized, is lined with chilled plates under the tread of the wheels, and the rims of the wheels should also be chilled. The trough of the base may be furnished with a spout or other ordinary appliance by which it may be emptied. The wheels may be set at different distances from the center, so that they do not travel in the same path, and it may sometimes be desirable to employ more than the three wheels which I have above described. The shafts of the wheels should be loosely fitted into the frame or other steadiment at the journals, so that any one wheel may ride over an obstacle, if necessary, without disturbing the action of the others or straining their shafts. It is manifest that the principle of loading the wheels by a weighted cap may be usefully applied for compressing and stamping where wheels can be used for those and analogous purposes, and also that the office of the weight may be performed by a spring, a screw, or a weighted lever pressing upon the cap.

I claim as my invention and desire to secure by Letters Patent—

The combination of the circular cap and trough and the three crusher-wheels, constructed and operated substantially in the manner described.

A. HITCHCOCK.

Witnesses:
  I. BURNHAM,
  WM. KEMBLE HALL.